United States Patent [19]

Mott

[11] 4,003,297

[45] Jan. 18, 1977

[54] HYDRAULIC CYLINDER

[75] Inventor: Richard H. Mott, Sioux Falls, S. Dak.

[73] Assignee: Du-Al Manufacturing Company, Sioux Falls, S. Dak.

[22] Filed: Mar. 28, 1975

[21] Appl. No.: 563,125

[52] U.S. Cl. .................................... 92/78; 92/109; 92/163; 92/168; 92/253

[51] Int. Cl.[2] ..................... F15B 21/04; F16J 15/18; F16J 9/00

[58] Field of Search ............ 92/168, 257, 109, 163, 92/78

[56] References Cited

UNITED STATES PATENTS

| | | | |
|---|---|---|---|
| 1,128,089 | 2/1915 | Astrom | 92/168 |
| 3,011,845 | 12/1961 | Watt et al. | 92/168 |
| 3,147,671 | 9/1964 | Geyer | 92/168 |
| 3,443,486 | 5/1969 | Lanman | 92/253 |
| 3,665,816 | 5/1972 | Caudle | 92/168 |
| 3,685,398 | 8/1972 | Little | 92/168 |

*Primary Examiner*—Paul E. Maslousky
*Attorney, Agent, or Firm*—Hill, Gross, Simpson, Van Santen, Steadman, Chiara & Simpson

[57] ABSTRACT

A hydraulic cylinder assembly for farm machinery or the like including a tubular elongate cylinder with a smooth inner cylindrical wall and a fluid inlet at a first end with a hollow piston rod slidable therein having an annular piston secured at a first end and slidable within the cylinder wall with the piston carrying axially spaced wear rings and plastic annular sealing rings therebetween and a T-shaped backup ring therebetween, a guide and seal retainer within the cylinder at the second end thereof for the second end of the piston rod held in place by a retainer nut threaded onto the cylinder and carrying a wiper ring in a groove and holding a seal between the guide ring and retainer nut.

9 Claims, 2 Drawing Figures

HYDRAULIC CYLINDER

BACKGROUND OF THE INVENTION

The present invention relates to improvements in farm machinery, and more particularly in hydraulic cylinder and piston assemblies of the type used to operate elements of farm machinery and the like.

Hydraulic operated piston and cylinder assemblies are used in many forms in farm machinery and as used, must be capable of continued reliable operation without failure. They are exposed to the elements to a greater extent than in most machinery, and generally receive little attention or maintenance, or if maintained, they still must be capable of operation by inexperienced personnel and relatively unsophisticated maintenance people. Because of being exposed to the elements and to adjacent operating parts, they must be sufficiently rugged to receive impacts, shocks and vibrations without leaking or breaking and, of course, must be capable of operation through a wide range of temperatures wherein hydraulic fluid viscosities change greatly.

Another essential is that the parts must be simple and easy to construct, and thereby easy to disassemble and maintain for servicing. Various attempts have been made to provide foolproof piston and cylinder assembly and to extend their operating life, but these have not always been successful in that difficulties still arise.

It is accordingly an object of the present invention to provide an improved cylinder assembly for use in farm machinery which provides improvements over structures heretofore available and wherein the parts are more simply made and assembled than in devices heretofore available and wherein the elements of construction are particularly well adapted to withstand the rigors of operation to which they are subjected on farm machinery. One of the more specific objects of the invention is to provide a cylinder and piston assembly wherein abrasive contaminants which may enter the hydraulic oil supply can be captured in a manner wherein they do not necessarily score the cylinder tube.

A further object of the invention is to provide an improved piston and seal ring assembly for use between the cylinder and piston in a low pressure cylinder assembly for hydraulic farm machinery. A further object is to provide an improved sealing and assembly mechanism for a piston rod in a hydraulic cylinder assembly wherein repair of the rod seal is easily accomplished, and assembly and disassembly is more readily performed.

Other objects, advantages and features of the invention, as well as equivalent structures which are intended to be covered herein will become more apparent with the teaching of the principles of the invention in connection with the disclosure of the preferred embodiment thereof in the specification, claims, and drawings in which:

ON THE DRAWINGS

Figure 1:
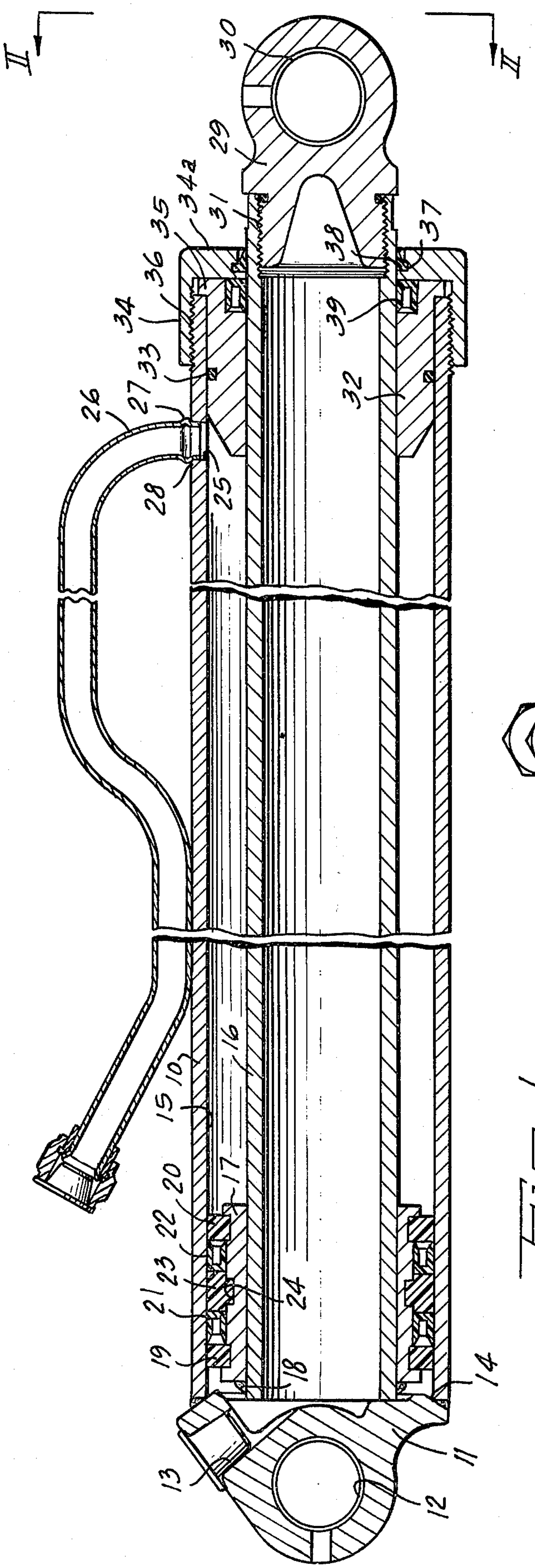
Figure 2:
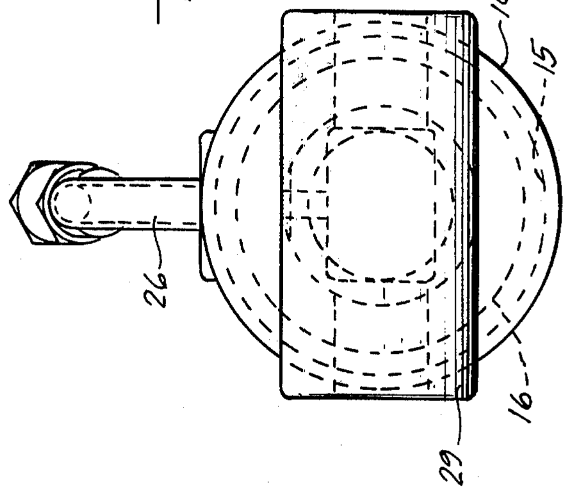

FIG. 1 is a sectional view taken substantially through the axis of a cylinder assembly and generally line II—II of FIG. 1; and FIG. 2 is an end elevational view of the cylinder assembly of FIG. 2.

DESCRIPTION

As illustrated in FIGS. 1 and 2, the assembly shown includes an elongate tubular steel elongate cylinder 10 having a smooth cylindrical inner wall surface 15. At a first end of the cylinder is a casting 11 which closes the cylinder end and has a threaded hydraulic inlet and outlet fluid port 13 to which a hydraulic line connected to a pump and control valving may be connected. The casting has an opening 12 at the end for mounting it on the machine or to a moving part, and the casting is secured to the end of the cylinder by an annular weld at 14.

Extending coaxially within the cylinder 10 is a piston rod 16 which is a hollow elongate tubular member and will normally contain oil within the center as it reciprocates axially back and forth within the cylinder responsive to the supply and escape of hydraulic fluid.

Carried on a first end of the piston rod 16 is a piston 17 which is annular in shape and is secured to the end of the rod by an annular weld bead 18 on the end of the piston facing the hydraulic fluid pressure chamber.

The piston is grooved on its outer annular surface and carries at its ends annular wear rings 19 and 20 which slide against the inner wall 15 of the cylinder. Spaced axially inwardly from each of the wear rings are annular sealing rings 21 and 22. These wear rings are preferably of plastic so as to be able to receive in embedded form, contaminants, which get into the hydraulic system. These contaminants by becoming embedded in the rings, will not score the smooth inner cylinder wall 15.

Centrally located between the sealing rings 21 and 22 is a backup ring 23. This ring is T-shaped with the stem of the T seated in an annular groove 24 in the piston. By making the backup ring of plastic and having a T-shape, it prevents extrusion of the seals when the hydraulic fluid chamber is pressurized.

The space between the piston rod 16 and the cylinder wall 15 is pressurized and vented through a tube 26 which communicated with the space through a radial port 25 in the cylinder. The tube is flared at 27 to seat against the outer surface of the cylinder and the tube 26 may be positively secured to the cylinder by brazing at 28. Oil is delivered through passage 13 for the power stroke, and oil is delivered through line 26 for the return stroke of the piston. The seals on the piston are arranged to take pressure from either direction.

At the second end of the cylinder and piston rod, the rod carries a connector end 29 with a cross-opening 30 therethrough to mount on the machine or to a moving part. The rod end 29 is preferably attached to the hollow piston rod by threads 31 with the end 29 threaded lockingly tight in position, sealed by O-ring 40.

Carried on the second end of the piston rod and located between the rod in the second end of the cylinder is an annular guide and seal retainer ring 32. The seal retainer ring has a smooth inner surface in which the piston rod slides, and has an annular outwardly facing groove in which is seated a seal such as an O-ring 33 to help prevent the escape of pressurized hydraulic fluid.

The guide ring 32 is held in place by an annular retainer nut 34. The retainer nut has an annular skirt which is internally threaded at 36 to thread onto the threaded outer surface of the second end of the cylinder.

The retainer nut has an annular radially inwardly extending flange 34*a* which overlies the guide ring 32 and locks it in place within the cylinder. An annular flange is located at 35 on the guide ring to seat it against the end of the cylinder.

The guide and seal retainer ring has an annular groove at one end for receiving a piston rod seal 39. This piston rod seal is held in place by the flange 34*a* of the retainer nut. The retainer nut also has a groove at its inner surface to have a wiper ring 38.

In operation as the hydraulic chamber is pressurized or relieved through the port 13, the piston 17 slides along within the cylinder so that the two connector ends 11 and 29 move apart or together to operate hydraulic activated equipment on the machine. This low pressure hydraulic unit is capable of operation for a substantially indefinite period of operation without debilitating wear and is capable of operation over a wide range of viscosities of hydraulic fluid and in the presence of outdoor elements such as are encountered with farm machinery. The features and advantages above set forth are incorporated in the unique structure, and for example, positive fastening between the piston and the rod is accomplished by the weld, and the piston is isolated from the cylinder tube by duplicate wear rings and a backup ring with the abrasive contaminants being capable of being embedded in the plastic rings without scoring the cylinder tube. The simply assembled and constructed piston rod seal is held in place by the retainer nut which makes the unit capable of replacement of seals if necessary.

I claim as my invention:

1. A double acting hydraulically powered cylinder and hollow piston rod assembly which comprises an elongated tubular cylinder with first and second ends and a smooth cylindrical inner wall surface between said ends, a first connector secured to and closing the first end of said cylinder having a first fluid port, a hollow tubular elongated piston rod of substantially smaller outer diameter than the inner diameter of said cylinder having first and second ends and being slidable through said second end of said cylinder, said outer diameter of said piston rod being constant along the full length of the rod, a piston sleeve surrounding and seated on the first end of said piston rod along the entire length of the sleeve, a weld bond securing one end of said piston sleeve to said piston rod, a second connector secured to said second end of said piston rod extending beyond the second end of said cylinder, a guide sleeve in said second end of the cylinder between said piston rod and cylinder and slidably supporting said piston rod in the cylinder, said piston sleeve having wear ring grooves therearound adjacent the opposite ends of the sleeve and a backup ring groove therearound between said wear ring grooves, a wear ring mounted in each wear ring groove projecting radially therefrom in bearing engagement with said smooth cylindrical inner wall surface of said cylinder, a backup ring mounted in said backup ring groove and projecting radially therefrom, a seal ring surrounding said piston sleeve on each side of said backup ring between the backup ring and wear rings, and a second fluid port in said cylinder adjacent said guide sleeve communicating with a space between said piston rod and said cylinder, whereby fluid introduced into the first port will be sealed from said space between the piston rod and cylinder and the second port by said piston sleeve and said seal rings around the sleeve to fill and propel the piston rod for moving the second connector away from the first connector while fluid introduced into the second port will fill the space between the piston rod and cylinder and be sealed from the first port and interior of the piston rod by said piston sleeve and said seal rings around said piston sleeve to retract the piston rod into the cylinder and move the second connector toward the first connector.

2. The assembly of claim 1 wherein the backup ring is T-shaped in cross section with a stem seated in said backup ring groove and a head around the piston sleeve bottoming said seal rings and riding on said cylinder wall to prevent extrusion of the seal rings.

3. The assembly of claim 1 wherein said wear rings are formed of plastics material adapted to embed solid contaminants in the fluid from said first and second ports to minimize scoring of the cylinder wall.

4. A double acting hydraulically powered cylinder and hollow piston rod assembly which comprises an elongated tubular cylinder with first and second ends and a smooth cylindrical inner wall surface between said ends, a first connector secured to and closing the first end of said cylinder having a first fluid port, a hollow tubular elongated piston rod of substantially smaller outer diameter than the inner diameter of said cylinder having first and second ends and being slidable through said second end of said cylinder, a piston sleeve surrounding the first end of said piston rod, means securing said piston sleeve to said piston rod, a second connector secured to said second end of said piston rod extending beyond the second end of said cylinder, a piston rod guide sleeve in said second end of said cylinder between said piston rod and cylinder and slidably supporting said piston rod in said cylinder, said guide sleeve having a flange overlying the second end of said cylinder, a cap threaded on said second end of said cylinder clamping the flange of said guide sleeve against said second end of said cylinder, a counterbore in the flanged end of said guide sleeve, a seal ring seated in said counterbore sealingly engaging said piston rod, said cap, and said guide sleeve to prevent leakage out of said cylinder between the guide sleeve and the piston rod, said piston sleeve having wear ring grooves therearound adjacent the opposite sides of said sleeve and a backup ring groove therearound between said wear ring grooves, a wear ring mounted in each wear ring groove projecting radially therefrom in bearing engagement with said smooth cylindrical inner wall surface of said cylinder, a backup ring mounted in said backup ring groove and projecting radially therefrom, a seal ring surrounding said piston sleeve on each side of said backup ring between the backup ring and wear rings, and a second fluid port in said cylinder adjacent said guide sleeve communicating with a space between piston rod and said cylinder, whereby fluid introduced into the first port will be sealed from the space between the piston rod and cylinder and the second port by said piston sleeve and said seal rings around said piston sleeve to fill and propel the piston rod for moving the second connector away from the first connector while fluid introduced into the second port will fill the space between the piston rod and cylinder and will be sealed from the first port and interior of the piston rod by said piston sleeve and said seal rings around said piston sleeve to retract the piston ring into the cylinder and move the second connector toward the first connector.

5. The assembly of claim 4 wherein said piston rod guide sleeve has a peripheral groove therearound and a seal ring seated in this groove engages the inner wall of the cylinder to prevent leakage between the guide sleeve and cylinder.

6. A hydraulic cylinder assembly which comprises a tubular elongated cylinder with first and second open ends and a smooth cylindrical inner wall surface between said ends, a hollow tubular elongated piston rod of substantially smaller outer diameter than the inner diameter of said cylinder telescoped within the cylinder and having first and second open ends, a piston sleeve seated along its entire length around the first open end of said piston rod and having an end welded to said rod, said piston sleeve having axially spaced wear ring grooves therearound with a backup ring groove between said wear ring grooves, axially spaced plastics material wear rings in said wear ring grooves and projecting therefrom to ride on the smooth cylindrical inner wall surface of the cylinder, a backup ring in said backup ring groove between said plastics rings, seal rings surrounding said piston sleeve between the backup ring and the plastic rings riding on the smooth inner wall of said cylinder, a first connector closing the first open end of said cylinder and having an inlet port communicating with said piston sleeve and the interior of said piston rod through the first open end of said piston rod, a second connector closing the second open end of said piston rod beyond said cylinder, a guide sleeve in said second open end of said cylinder slidably supporting said piston rod, an end cap threaded on the second end of said cylinder surrounding said piston rod and clamping said guide sleeve in the cylinder, a first seal carried by said guide sleeve engaging the piston rod and the end cap to prevent leakage between said sleeve and piston rod, a second seal carried by said guide sleeve engaging the cylinder to prevent leakage between the guide sleeve and cylinder, a second port communicating with a space in the cylinder around said piston rod and between the guide sleeve and piston sleeve whereby fluid introduced into the first port will propel the rod out of the cylinder to move the second connector away from the first connector and fluid introduced into the second port will retract the rod into the cylinder to move the second connector toward the first connector.

7. The assembly of claim 6 wherein the second connector is threaded into the second end of the rod.

8. The assembly of claim 6 wherein said end cap has an annular groove surrounding the piston rod and an annular wiping ring is seated in said groove to prevent ingress of dirt around the rod into the cylinder.

9. The assembly of claim 6 wherein the plastics wear rings are composed of plastics material effective to embed solid contaminants in the fluid from the ports, the backup ring is T-shaped in cross section with a stem seated in a piston sleeve groove and a head bottoming the seal rings, and the seal rings have grooves opening to the plastics wear rings to be expanded by fluid pressure leaking past the plastics wear rings.

* * * * *